United States Patent [19]
Kozol et al.

[11] Patent Number: 5,140,521
[45] Date of Patent: Aug. 18, 1992

[54] METHOD FOR DELETING A MARKED PORTION OF A STRUCTURED DOCUMENT

[75] Inventors: Michael J. Kozol, Gaithersburg; Chan S. Lim, Potomac; Robert Perry, Jr., Silver Spring, all of Md.

[73] Assignee: International Business Machines Corporation, Armonk, N.Y.

[21] Appl. No.: 344,343

[22] Filed: Apr. 26, 1989

[51] Int. Cl.⁵ ............................................. G06F 15/21
[52] U.S. Cl. .................................. 364/419; 395/600; 395/146
[58] Field of Search ......................................... 364/419

[56] References Cited

U.S. PATENT DOCUMENTS

| | | | |
|---|---|---|---|
| 4,393,463 | 7/1983 | Aiken, Jr. .............................. | 395/146 |
| 4,454,576 | 6/1984 | McInroy et al. ..................... | 395/145 |
| 4,481,603 | 11/1984 | McCaskill et al. .................. | 395/146 |
| 4,539,653 | 9/1985 | Barlett et al. ........................ | 364/419 |
| 4,633,430 | 12/1986 | Cooper .................................. | 364/419 |
| 4,686,649 | 8/1987 | Rush et al. ........................... | 364/419 |
| 4,713,754 | 12/1987 | Agarwal et al. ..................... | 395/600 |
| 4,739,477 | 4/1988 | Barker et al. ........................ | 395/600 |
| 4,807,142 | 2/1989 | Agarwal ............................... | 395/600 |
| 4,881,197 | 11/1989 | Fischer ................................. | 395/600 |
| 4,959,769 | 9/1990 | Cooper et al. ....................... | 395/600 |
| 5,003,499 | 3/1991 | Fujiwara et al. .................... | 395/146 |
| 5,051,930 | 9/1991 | Kuwabara et al. . | |
| 5,075,787 | 12/1991 | Shaughnessy ....................... | 358/452 |
| 5,079,700 | 1/1992 | Kozoll et al. ........................ | 364/419 |

Primary Examiner—Gail O. Hayes
Attorney, Agent, or Firm—John E. Hoel

[57] ABSTRACT

A method is disclosed for deleting a marked portion of a structured document so as to prevent damaging the structure of the document. The method examines the contents of a marked portion of a structured document and determines which begin and end tags are unmatched. A begin tag whose end tag has not been marked or vice versa, is flagged so that it is not deleted when the contents of the mark are deleted. This allows the Structured Delete function to delete a marked portion of the structured document without damaging the document's structure.

2 Claims, 3 Drawing Sheets

FIG. 2

[p]WE HOLD THESE TRUTHS TO BE SELF-EVIDENT, THAT ALL MEN ARE CREATED EQUAL, THAT THEY ARE ENDOWED BY THEIR CREATOR WITH CERTAIN UNALIENABLE RIGHTS, THAT AMONG THESE ARE [/p] — PARAGRAPH 28
[LIST]
    [LI] LIFE, [/LI] — 32
    [LI] LIBERTY AND [/LI] — 34 — LIST 30
    [LI] THE PURSUIT OF HAPPINESS. [/LI] — 36
[/LIST]
[p]THAT TO SECURE THESE RIGHTS, GOVERNMENTS ARE INSTITUTED AMONG MEN, DERIVING THEIR JUST POWERS FROM THE CONSENT OF THE GOVERNED. [/p] — PARAGRAPH 38

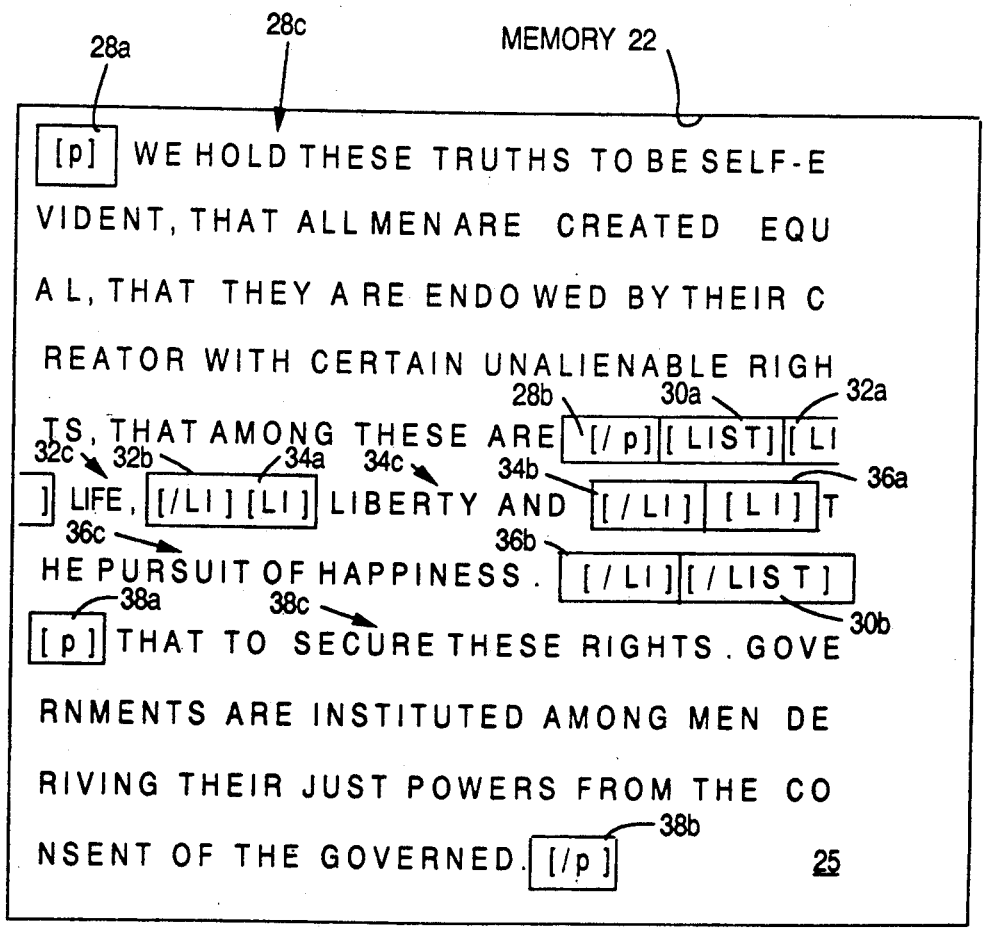

METHOD FOR DELETING A MARKED PORTION OF A STRUCTURED DOCUMENT

BACKGROUND OF THE INVENTION

1. Technical Field

The invention disclosed broadly relates to data processing methods and more particularly relates to an improved method for deleting a marked portion of a structured document.

2. Background Art

Current editors provide a block delete function which allows a user to delete a marked portion of a document. These delete functions delete ALL of the marked content. If a matched pair of formatting controls or tags are required to provide particular formatting (e.g. — boldface type) and only one control or tag is included in the mark, the block delete leaves behind an unmatched control. Although this type of deletion is flexible and never fails, it normally causes the document to become invalid (i.e. — incorrectly formatted or misstructured).

In an editor which supports structured documents, this same type of unstructured deletion could result in a document whose structure is invalid (i.e. no longer adheres to the defined hierarchy of elements) if only one tag of a matched pair is included in the mark. This result would force the user to manually repair the document structure by inserting the missing tags. This repair is necessary to assure the correct formatting of the document.

In a non-WYSIWYG environment (one in which the structuring tags are displayed), this repair process would be difficult for a user who does not fully understand the document structure and tedious for the more advanced user. In a WYSIWYG environment (one in which the structuring tags are not displayed), repair of the document structure would be difficult for the advanced user and extremely difficult (maybe impossible) for a user who does not understand the structure of the document.

The following terminology is used throughout this disclosure.

SGML Standardized General Markup Language. A markup language consisting of begin and end tags used to prepare structured documents. Refer to International Standards Organization standard 8879-1986 for definition and details.

Element. SGML-defined entity consisting of a begin tag and its content (including an end tag if necessary).

Root Element. The outermost element in a structured document which packages all contents of the document.

Structured Document. A document which has a defined hierarchy of elements such as that defined by SGML.

Mark. A portion of a document, visually altered (i.e. — highlighted, reverse-videoed) to indicate its selection for processing (e.g. — moving, copying, deleting, translating to uppercase, etc.).

Beginning of Mark. The document position, closest to the beginning of a document, which defines the starting boundary of a mark.

End of Mark. The document position, closest to the end of a document, which defines the ending boundary of a mark.

Current Document Position. The document position which determines the focal point for an editing operation, usually the location of the cursor.

Source Document. A document which contains the mark.

Target Document. A document which contains the location to which the contents of the mark will be copied.

Target Location. The document position contained in the target document at which the contents of the mark will be inserted. Note that the target location can be contained within the document which contains the mark, but cannot be contained within the mark itself.

WYSIWYG. An acronym for "What you see is what you get." The term refers to the display of edited text in the same form as it will appear when printed.

OBJECTS OF THE INVENTION

It is therefore an object of the invention to provide an improved method for deleting a marked portion from a structured document.

It is another object of the invention to provide an improved method to perform the deletion of a marked portion of a structured document, without damaging the structure of the document.

SUMMARY OF THE INVENTION

These and other objects, features and advantages of the invention are accomplished by the method for deleting a marked portion of a structured document, disclosed herein.

The method deletes a marked portion of a structured document, taking advantage of the hierarchical document structure, such as that defined by the Standard Generalized Markup Language (SGML). The method allows the user to delete a marked portion of the document without damaging the structure of the document. The invention examines the contents of a marked portion of a structured document and determines which begin and end tags are unmatched (i.e. — those tags whose corresponding partner tags are not included in the mark). A begin tag whose end tag has not been marked, or vice versa, is flagged so that it is not deleted when the contents of the mark are deleted. This technique of leaving behind certain tags allows the Structured Delete function to delete a marked portion of a structured document without damaging the document's structure. In this manner, the user is provided with a method to perform the deletion operation of a marked portion of a structured document without damaging the structure of the document.

DESCRIPTION OF THE DRAWINGS

These and other objects, features and advantages of the invention will, be more fully appreciated with reference to the accompanying figures.

FIG. 2 is an example of control element tags and associated text.

FIG. 3 is a depiction of the memory organization of control element tags and associated text.

DESCRIPTION OF THE BEST MODE FOR CARRYING OUT THE INVENTION

Figure 1:
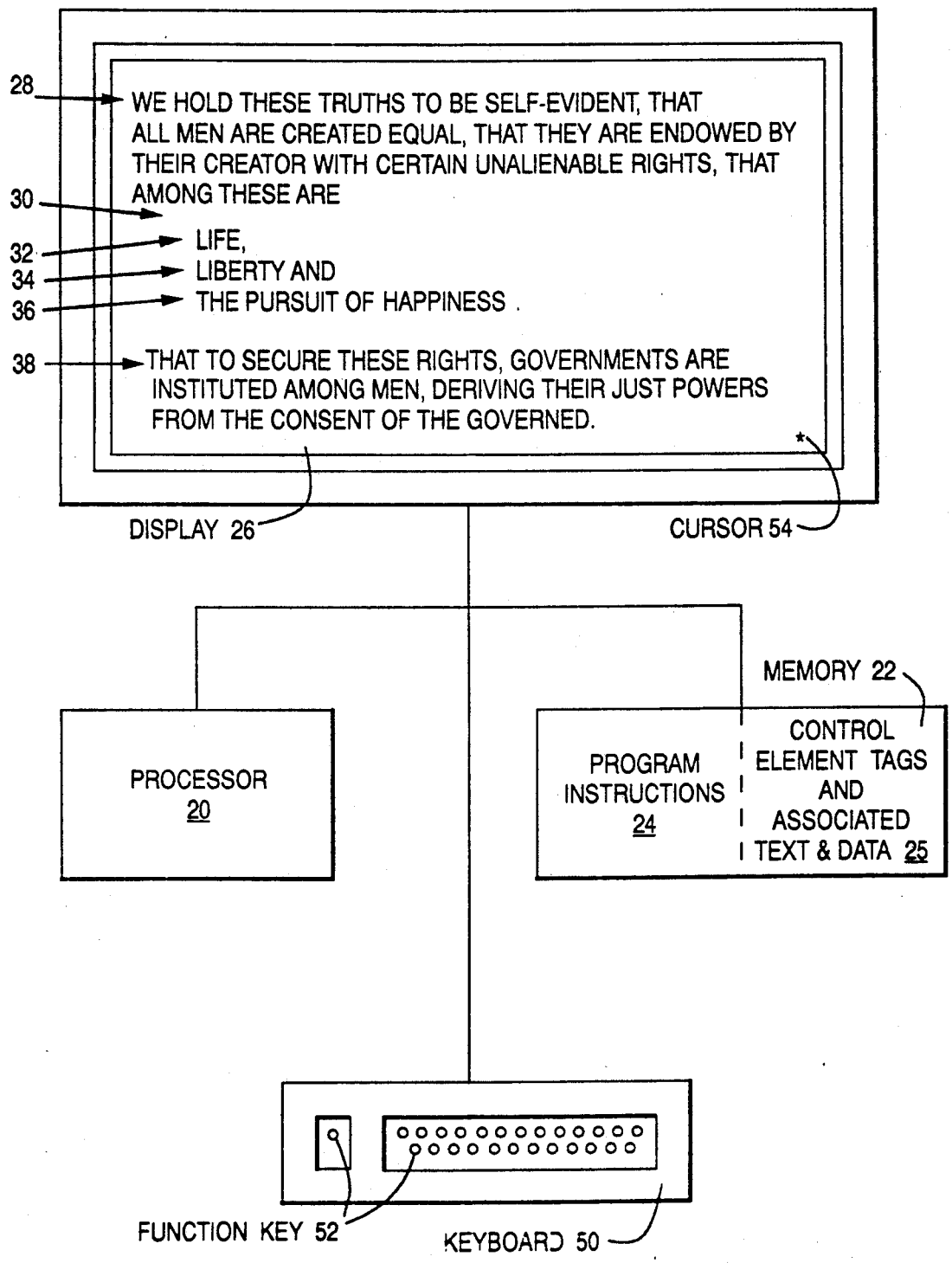
FIG. 1 is a system block diagram of the document editing system.

The document editing system shown in FIG. 1 includes a processor 20 and a memory 22, both coupled to the keyboard 50 and the display 26. The processor 20 executes program instructions 24 stored in the memory 22. The display device 26 coupled to the processor 20 displays in WYSIWYG form, a plurality of document images in a structured document such as paragraphs 28 and 38, the list 30, which includes the list items 32, 34 and 36, shown in the display 26 of FIG. 1. Images can include lists which are either unordered or ordered, and images can also include graphics as well as text. The document images 28-38 are displayed in an ordered sequence, as can be seen in FIG. 2, using structured document notation, where the ordered sequence is specified by a corresponding ordered sequence of a plurality of image control elements or tags. The paragraph 28 in FIG. 2 is shown in the structured document notation at begin tag [p], and at end tag [/p]. Each image such as the paragraph 28 shown in FIG. 2, is a structured document element having a begin tag [p], the text of the paragraph, and then an end tag [/p]. The begin tag and the end tag serve as an image type value, in this case indicating a paragraph. The order of occurrence of the paragraph 28 as occurs on the display 26, is determined by the order of occurrence of the structured document element representing that paragraph 28 shown in FIG. 2, within the context of the order of occurrence of the other structured document elements such as for the list 30 and for the list 38. This order of occurrence of the structured document elements is a sequence indication.

The order of occurrence of the structured document elements such as the paragraph 28, list 30 and the paragraph 38, can be determined by their order of storage in the memory 22 as shown in FIG. 3. FIG. 3 shows that the control element tags and associated text 25 of FIG. 2 have been stored in the memory 22 in a linear sequential order. The paragraph 28 is represented by the begin tag 28A and the end tag 28B which surrounds the paragraph text 28C. The list 30 represented by begin tag 30A and the end tag 30B and the information contained therebetween, has been stored in the next consecutive memory locations in the memory 22, after the location of the paragraph 28. This would provide a sequence indication for the paragraph 28 and the list 30.

Contained within the list 30, between the begin tag 30A and the end tag 30B, is the list item elements 32, 34 and 36. The list item element 32 is represented by the begin tag 32A and the end tag 32B, between which is located the text 32C. The list item element 34 is represented by the begin tag 34A, the end tag 34B and between which lies the text 34C. The list item element 36 is represented by the begin tag 36A, the end tag 36B and the text lying therebetween, 36C.

Located in consecutive memory locations following the list 30, is the paragraph 38 which consists of the begin tag 38A and the end tag 38B, between which lies the text portion 38C.

In an alternate embodiment of the invention, the sequence of image control elements can have threaded addresses, which can go both in the forward direction and in the reverse direction, so that each respective image control element contains the prior address of the preceding image control element and the next address for the next occurring image control element. In this manner, the program instructions can progress along the sequence of image control elements in the same order as for their corresponding images as they occur in the display 26.

The location of the cursor 54 within the text 25 is determined by a pointer which sequentially points to consecutive memory locations in the memory 22 where the text 25 is stored.

The keyboard 50 is coupled to a processor 20, and can have one or more function keys 52, including a deletion function key. The display device 26 includes a cursor 54, displayed thereon, at a current document position in the sequence of images 28 through 38.

The invention examines the contents of a marked portion of a structured document 25 and determines which begin and end tags are unmatched (i.e. — those tags whose corresponding partner tags are not included in the mark). A begin tag whose end tag has not been marked, or vice versa, is flagged so that it is not deleted when the contents of the mark is deleted. This technique of leaving behind certain tags allows the Structured Delete function to delete a marked portion of a structured document without damaging the document's structure.

Figure 4:
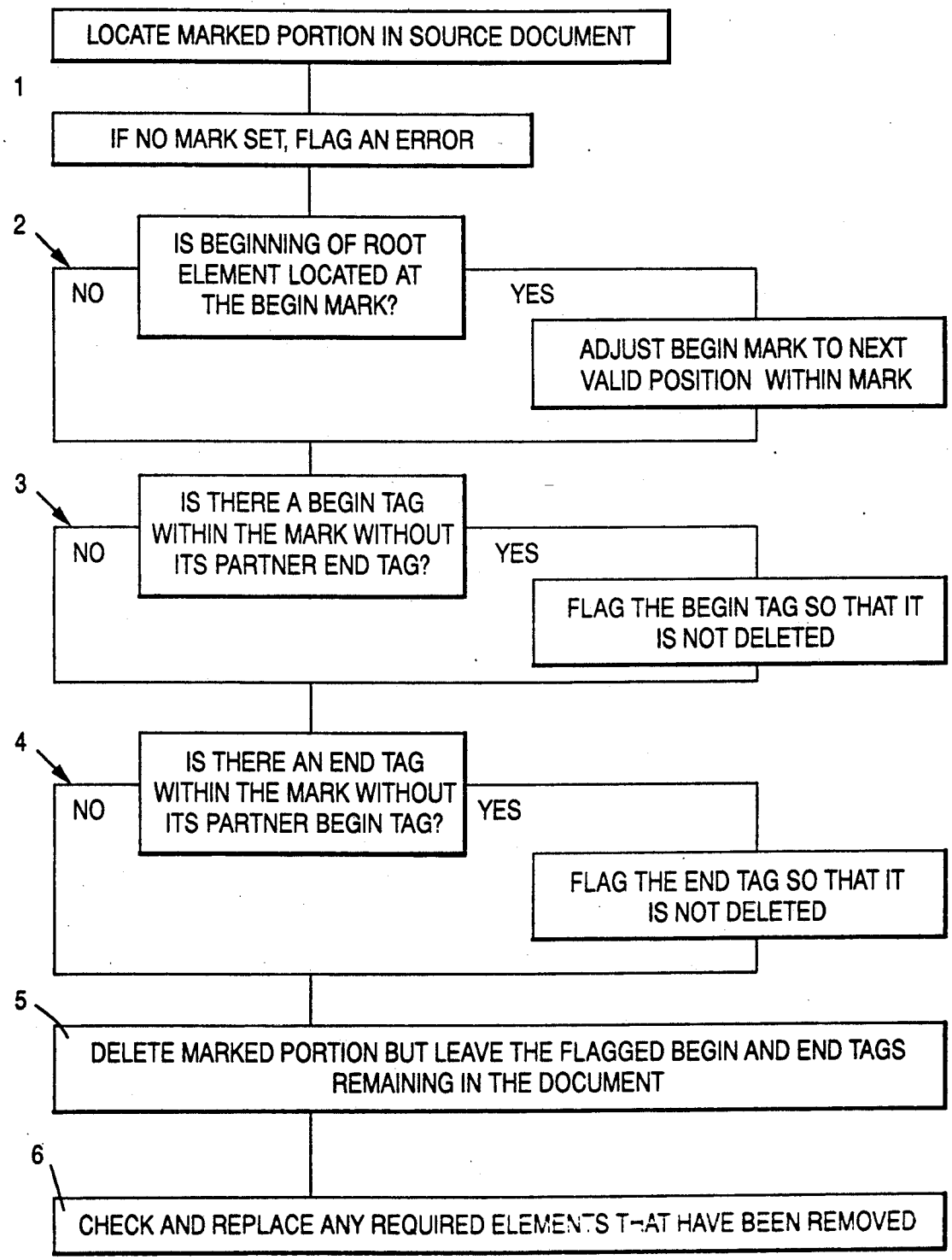
FIG. 4 is a flow diagram of the method of the invention.

The flow diagram of FIG. 4 describes the sequence of operational steps of the program instructions 24, in accordance with the invention.

Step 1: If no mark has been set — An error is generated.

Step 2: If the beginning of the root element of the document is located at the begin mark document position — The begin mark document position is adjusted to the next valid position within the mark. If this causes the mark to collapse to an empty mark, no deletion is performed. Note that this heuristic is used to guarantee that the user cannot delete the required root element of the document.

Step 3: For each begin tag within the marked portion of a structured document — If the corresponding end tag is outside the marked portion, the begin tag is flagged so that it is not deleted. This flagging is the mechanism which allows the structured delete function to preserve the validity of the document structure.

Step 4: For each end tag within the marked portion of a structured document — If the corresponding begin tag is outside the marked portion, the end tag is flagged so that it is not deleted. This flagging is the mechanism which allows the structured delete function to preserve the validity of the document structure.

Step 5: When all begin and end tags are processed within the marked portion — The marked portion of the document is deleted except for the begin and end tags that have been flagged. This results in the deletion of the maximum amount of content.

Step 6: When the deletion is completed — A check is made to determine if any elements required by the document hierarchy were removed during the deletion. If so, these elements are reinserted (with no content) at the appropriate document positions.

EXAMPLES

The following examples are provided for clarification of the disclosed invention. In the following examples, the current document position is represented by "*"(asterisk). The contents of the current marked portion are boldface. Begin tags are enclosed by "["and "]"(brackets). End tags are enclosed by "[/"and "]"(end tags are included for clarity; in most cases they are not necessary). Begin and end tags which are saved for use in the validation and insertion performed by the Structured Copy function are terminated with capital X "X]". Tag names are IBM GML Starter Set tag names. Indentation is used to emphasize the hierarchical structure of the document.

EXAMPLE 1

Suppose a user is editing the following document and has already marked a portion of the document:

```
[gdoc]
    [p]This is the first paragraph in the document.[/p]
    [p]This is the second paragraph in the document and
        contains an ordered list.
        [ol]
            [li]This is the first list item in the
                ordered list[/li]
            [li]This is the second list item in the
                ordered list[/li]
            [ul]
                [li]This is the first list item in the
                    unordered list[/li]
                [li]This is the second list item in the
                    unordered list[/li]
            [/ul]
            [li]This is the third list item in the
                ordered list[/li]
        [/ol]
    [p]
    [p]This is the third paragraph in the document.[/p]
    [p]This is the last paragraph in the document.[/p] [/gdoc]
```

If the user invoked the Structured Delete function, the following processing would occur:

Step 1: Since a mark already exists in the document, no error is generated.

Step 2: Since the beginning of the root element of the document is located at the begin mark document position, the begin mark document position is adjusted to the next valid position within the mark. This would result in the following:

```
[gdoc]
    [p]This is the first paragraph in the document.[/p]
    [p]This is the second paragraph in the document and
        contains an ordered list.
        [ol]
            [li]This is the first list item in the
                ordered list[/li]
            [li]This is the second list item in the
                ordered list[/li]
            [ul]
                [li]This is the first list item in the
                    unordered list[/li]
                [li]This is the second list item in the
                    unordered list[/li]
            [/ul]
            [li]This is the third list item in the
                ordered list[/li]
        [/ol]
    [/p]
    [p]This is the third paragraph in the document.[/p]
    [p]This is the last paragraph in the document.[/p] [/gdoc]
```

Step 3: Since the end tags of all marked begin tags are contained in the mark, no flagging occurs.

Step 4: Since the begin tags of all marked end tags are contained in the mark, no flagging occurs.

Step 5: The marked portion of the document is deleted, resulting in the following:

```
[gdoc]
    [p]This is the third paragraph in the document.[/p]
```

-continued
```
    [p]This is the last paragraph in the document.[/p] [/gdoc]
```

Step 6: Since no required elements were deleted, no change is made to the document.

EXAMPLE 2

Suppose a user is editing the following document and has already marked a portion of the document:

```
[gdoc]
    [p]This is the first paragraph in the document.[/p]
    [p]This is the second paragraph in the document and
        contains an ordered list.
        [ol]
            [li]This is the first list item in the
                ordered list[/li]
            [li]This is the second list item in the
                ordered list[/li]
            [ul]
                [li]This is the first list item in the
                    unordered list[/li]
                [li]This is the second list item in the
                    unordered list[/li]
            [/ul]
            [li]This is the third list item in the
                ordered list[/li]
        [/ol]
    [/p]
    [p]This is the third paragraph in the document.[/p]
    [p]This is the last paragraph in the document.[/p] [/gdoc]
```

If the user invokes the Structured Delete function, the following processing would occur:

Step 1: Since a mark already exists in the document, no error is generated.

Step 2: Since the beginning of the root element of the document is not located at the begin mark document position, no adjustment is necessary.

Step 3: The Structured Delete function flags with a "[X" the begin tags which cannot be deleted since their corresponding end tags are not in the mark. The following results:

```
[gdoc]
    [p]This is the first paragraph in the document.[/p]
    [p]This is the second paragraph in the document and
        contains an ordered list.
        [ol]
            [li]This is the first list item in the
                ordered list[/li]
            [li]This is the second list item in the
                ordered list[/li]
            [ul]
                [li]This is the first list item in the
                    unordered list[/li]
                [li]This is the second list item in the
                    unordered list[/li]
            [/ul]
            [Xli]This is the third list item in the
                ordered list[/li]
        [/ol]
    [/p]
    [p]This is the third paragraph in the document.[/p]
    [p]This is the last paragraph in the document.[/p] [/gdoc]
```

Step 4: The Structured Delete function flags the end tags which cannot be deleted since their corresponding begin tags are not in the mark. The following results:

```
[gdoc]
    [p]This is the first paragraph in the document.[/p]
```

```
[p]This is the second paragraph in the document and
   contains an ordered list.
   [ol]
      [li]This is the first list item in the
          ordered list[X/li]
      [li]This is the second list item in the
          ordered list[/li]
      [ul]
         [li]This is the first list item in the
             unordered list[/li]
         [li]This is the second list item in the
             unordered list[/li]
      [/ul]
      [Xli]This is the third list item in the
           ordered list[/li]
   [/ol]
[/p]
[p]This is the third paragraph in the document.[/p]
[p]This is the last paragraph in the document.[/p] [/gdoc]
```

Step 5: The marked portion of the document is deleted, resulting in the following:

```
[gdoc]
   [p]This is the first paragraph in the document.[/p]
   [p]This is the second paragraph in the document and
      contains an ordered list.
      [ol]
         [li]This is the first [/li]
         [li] list[/li]
      [/ol]
   [/p]
   [p]This is the third paragraph in the document.[/p]
   [p]This is the last paragraph in the document.[/p] [/gdoc]
```

EXAMPLE 3

Suppose a user is editing the following document and has already marked a portion of the document:

```
[gdoc]
   [p]This is the first paragraph of the document.
      The document contains a single chapter whose
      title element is required by the document
      hierarchy.[/p]
   [hl]
      [title]TITLE FOR CHAPTER[/title]
      [p]This is the first paragraph of the chapter.[/p]
      [ol]
         [li]First list item in ordered list[/li]
         [li]Second list item in ordered list[/li]
      [/ol]
      [p]This is the last paragraph in the chapter.[/p]
   [/hl] [/gdoc]
```

Step 1: Since a mark already exists in the document, no error is generated.

Step 2: Since the beginning of the root element of the document is not located at the begin mark document position, no adjustment is necessary.

Step 3: The Structured Delete function flags with "X" the begin tags which cannot be deleted since their corresponding end tags are not in the mark. The following results:

```
[gdoc]
   [p]This is the first paragraph of the document.
      The document contains a single chapter whose
      title element is required by the document
      hierarchy.[/p]
   [hl]
      [title]TITLE FOR CHAPTER[/title]
```

```
      [p]This is the first paragraph of the chapter.[/p]
      [olX]
         [li]First list item in ordered list[/li]
         [li]Second list item in ordered list[/li]
      [/ol]
      [p]This is the last paragraph in the chapter.[/p]
   [hl] [/gdoc]
```

Step 4: Since the begin tags of all marked end tags are contained in the mark, no flagging occurs.

Step 5: The marked portion of the document is deleted, resulting in the following:

```
[gdoc]
   [p]This is the first paragraph of the document.
      The document contains a single chapter whose
      title element is required by the document
      hierarchy.[/p]
   [hl]
      [olX]    -
         [li]Second list item in ordered list[/li]
      [/ol]
      [p]This is the last paragraph in the chapter.[/p]
   [/hl] [/gdoc]
```

Step 6: Since the title element is required by the document hierarchy, the following would result:

```
[gdoc]
   [p]This is the first paragraph of the document.
      The document contains a single chapter whose
      title element is required by the document
      hierarchy.[/p]
   [hl]
      [title][/title]
      [olX]
         [li]Second list item in ordered list[/li]
      [/ol]
      [p]This is the last paragraph in the chapter.[/p]
   [/hl] [/gdoc]
```

The invention described herein requires the use of no special hardware or software. The invention can be implemented by any editor which operates upon structured documents.

The resulting invention guarantees that a structured document remains in a valid state when a selected portion is deleted from the document.

The invention exploits the defined hierarchy of a structured document in a generic manner. The invention will preserve the structure of the document by determining which begin and end tags are unmatched in the marked portion of the document; the type of begin or end tag (i.e. a begin tag for a paragraph, etc.) is not considered by this function. The invention always leaves a structured document in a valid state whether or not the marked portion contains matched sets of begin and end tags. The invention allows the user to mark a portion of a structured document and not be concerned whether he has included matched sets of begin and end tags in the mark. The invention relieves the user of having to fully understand the structure of the document since the structured deletion will never result in an invalid document structure. The invention relieves the user of manually repairing the structure of the document after a deletion is performed. The invention is useful in both WYSIWYG and non-WYSIWYG environments.

Although a specific embodiment of the invention has been disclosed, it will be understood by those having skill in the art that minor changes can be made to the specific embodiment without departing from the spirit and the scope of the invention.

What is claimed is:

1. A computer method in a data processing system for deleting text in a SGML structured document, comprising the steps of:

inputting by a user to a data processing system, SGML information defining an SGML hierarchy with a higher level type tag which i higher in the hierarchy than a lower level type tag and defining as a first tag pair a higher level type begin tag and a higher level type end tag and defining as a second tag pair a lower level type begin tag and a lower level type end tag;

inputting by a user to said data processing system a document with SGML tags, including a first higher level type begin tag, followed by a first lower level type begin tag, followed by a first text, followed by a first lower level type end tag which is paired with said first lower level type begin tag, which is followed by a second text, which is followed by a first higher level type end tag which is paired with said first higher level type begin tag, which is followed by a third text;

inputting by a user to said data processing system a marking of a source text in said document, said source text including said first text, said first lower level type end tag and said second text, said user further inputting a command to said data processing system to delete said source text;

identifying with said data processing system that said first lower level type end tag is in said source text;

searching with said data processing system for said first lower level type begin tag to form said second tag pair;

determining with said data processing system that said first lower level type begin tag is not in said source text;

flagging with said data processing system said first lower level type end tag in response to said determining step;

deleting with said data processor said first text and said second text in said source text and omitting from deletion said first lower level type end tag.

2. A computer method in a data processing system for deleting text in a SGML structured document, comprising the steps of:

inputting by a user to a data processing system, SGML information defining an SGML hierarchy with a higher level type tag which is higher in the hierarchy than a lower level type tag and defining as a first tag pair a higher level type begin tag and a higher level type end tag and defining as a second tag pair a lower level type begin tag and a lower level type end tag;

inputting by a user to said data processing system a document with SGML tags, including a first higher level type begin tag, followed by a first text, followed by a first lower level type begin tag, followed by a second text, followed by a first lower level type end tag which is paired with said first lower level type begin tag, which is followed by a first higher level type end tag which is paired with said first higher level type begin tag, which is followed by a third text;

inputting by a user to said data processing system a marking of a source text in said document, said source text including said first text, said first lower level type begin tag and said second text, said user further inputting a command to said data processing system to delete said source text;

identifying with said data processing system that said first lower level type begin tag is in said source text;

searching with said data processing system for said first lower level type end tag to form said second tag pair;

determining with said data processing system that said first lower level type end tag is not in said source text;

flagging with said data processing system said first lower level type begin tag in response to said determining step;

deleting with said data processor said first text and said second text in said source text and omitting from deletion said first lower level type begin tag.

* * * * *